(12) United States Patent
Wallace et al.

(10) Patent No.: US 11,665,412 B2
(45) Date of Patent: May 30, 2023

(54) MOUNTABLE DISPLAY CAMERA ASSEMBLY WITH ARM

(71) Applicant: Lenovo (Singapore) Pte. Ltd., Singapore (SG)

(72) Inventors: Brian William Wallace, Raleigh, NC (US); Cyan Godfrey, Chapel Hill, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/403,125

(22) Filed: Aug. 16, 2021

(65) Prior Publication Data

US 2023/0046711 A1    Feb. 16, 2023

(51) Int. Cl.
*H04N 23/51* (2023.01)
*H04N 23/54* (2023.01)
*H04N 23/57* (2023.01)
*H04N 23/53* (2023.01)
*F16M 11/04* (2006.01)
(Continued)

(52) U.S. Cl.
CPC ............ *H04N 23/51* (2023.01); *F16M 11/04* (2013.01); *F16M 13/005* (2013.01); *F16M 13/022* (2013.01); *G03B 17/561* (2013.01); *G06F 1/1605* (2013.01); *H04N 23/54* (2023.01); *H04N 23/57* (2023.01); *F16B 2001/0064* (2013.01); *G03B 17/566* (2013.01); *G06F 1/1686* (2013.01); *H04N 23/531* (2023.01)

(58) Field of Classification Search
CPC ............... H04N 5/2251; H04N 5/2252; H04N 5/225251; H04N 5/2253; H04N 5/2254; H04N 5/2257; H04N 23/50; H04N 23/51; H04N 23/54; H04N 23/55; H04N 23/57; H04N 23/531; G03B 17/02; G03B 17/561; G03B 17/566; G03B 2217/002; G06F 1/1605; G06F 1/1607; G06F 1/1686; F16M 11/04; F16M 11/041; F16M 11/043; F16M 11/06; F16M 11/26–30; F16M 13/005; F16M 13/02; F16M 13/022; F16M 2200/00; F16M 2200/02–028; F16B 2001/0064; F16B 7/10; H04M 1/0264
See application file for complete search history.

(56) References Cited

U.S. PATENT DOCUMENTS

| | | | | |
|---|---|---|---|---|
| 7,217,044 B1 * | 5/2007 | Marks, Jr. | ............ | F16M 11/12 348/E5.025 |
| 7,813,118 B2 * | 10/2010 | Burge | ................... | H04R 1/026 361/825 |

(Continued)

OTHER PUBLICATIONS

Sony Bravia TV Product (Model # KDL-48W590B) Figures 1-6—Feb. 2014 AND User Manual (cover page & pp. 2, 13-16) illustrates Vent Assembly encasing a "Side Panel" with two USB ports. (Year: 2014).*

Primary Examiner — Twyler L Haskins
Assistant Examiner — Akshay Trehan
(74) Attorney, Agent, or Firm — Brian J. Pangrle

(57) ABSTRACT

A system can include a display assembly that includes a display, a display side, a back side and a frame, where the back side includes a serial bus socket; and a camera assembly that includes a camera head unit coupled to an end of an arm, where an opposing end of the arm includes a serial bus connector receivable by the serial bus socket of the back side of the display assembly.

20 Claims, 12 Drawing Sheets

(51) Int. Cl.
*F16M 13/00* (2006.01)
*F16M 13/02* (2006.01)
*G03B 17/56* (2021.01)
*G06F 1/16* (2006.01)
*F16B 1/00* (2006.01)

(56) References Cited

U.S. PATENT DOCUMENTS

| | | | | |
|---|---|---|---|---|
| 7,957,765 | B1* | 6/2011 | Causey | H04M 1/0256 |
| | | | | 455/556.1 |
| 10,659,697 | B2* | 5/2020 | Yang | H04N 5/23296 |
| 2005/0024526 | A1* | 2/2005 | Wang | H04N 5/772 |
| | | | | D16/202 |
| 2005/0081302 | A1* | 4/2005 | Elsener | B25F 1/04 |
| | | | | 7/118 |
| 2006/0014563 | A1* | 1/2006 | Cheng | H04M 1/0274 |
| | | | | 455/557 |
| 2013/0178245 | A1* | 7/2013 | Kulas | H04M 1/0264 |
| | | | | 455/556.1 |
| 2014/0300809 | A1* | 10/2014 | Oliveira | H04N 5/2327 |
| | | | | 348/376 |
| 2015/0326764 | A1* | 11/2015 | Roshanravan | G03B 17/561 |
| | | | | 348/373 |
| 2017/0126971 | A1* | 5/2017 | Evans, V | H04N 5/23216 |
| 2017/0171528 | A1* | 6/2017 | Ent | G06F 1/1607 |
| 2018/0004256 | A1* | 1/2018 | Douglas | H04N 5/2252 |
| 2019/0215457 | A1* | 7/2019 | Enke | G08G 5/0069 |
| 2019/0258300 | A1* | 8/2019 | Gerardi | G06F 1/1679 |
| 2020/0170750 | A1* | 6/2020 | Coppersmith | A61B 90/361 |
| 2021/0165306 | A1* | 6/2021 | Guo | H04W 76/10 |

* cited by examiner

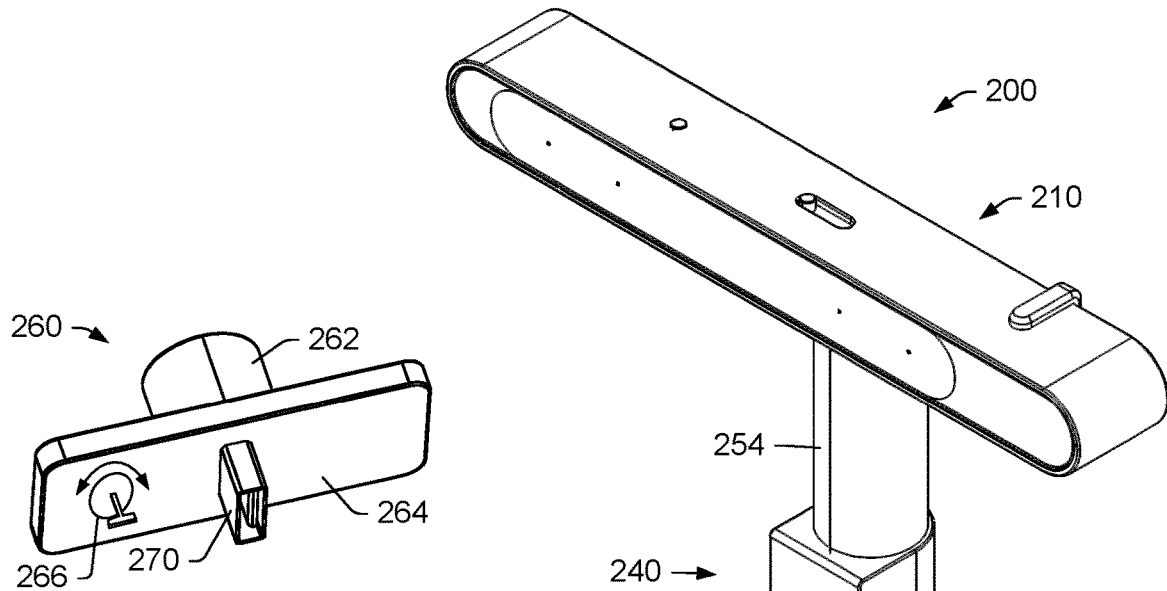
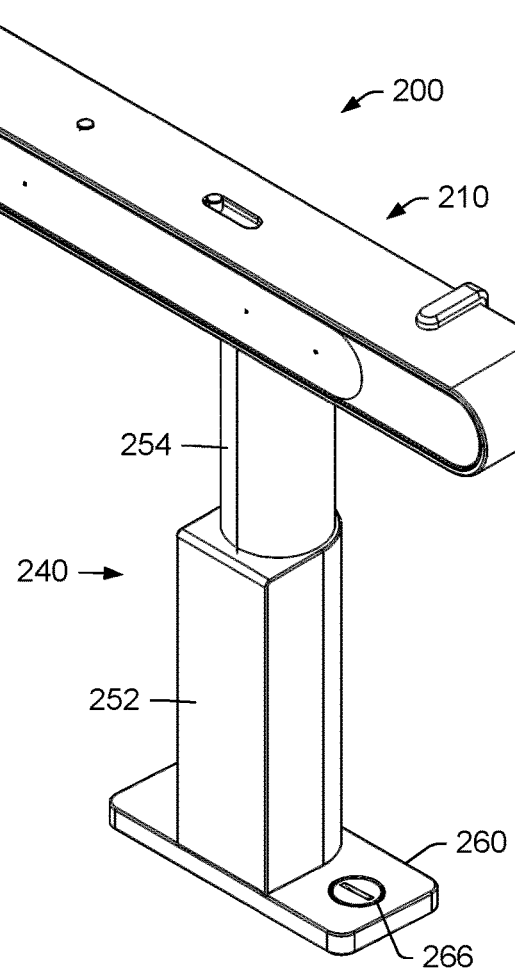
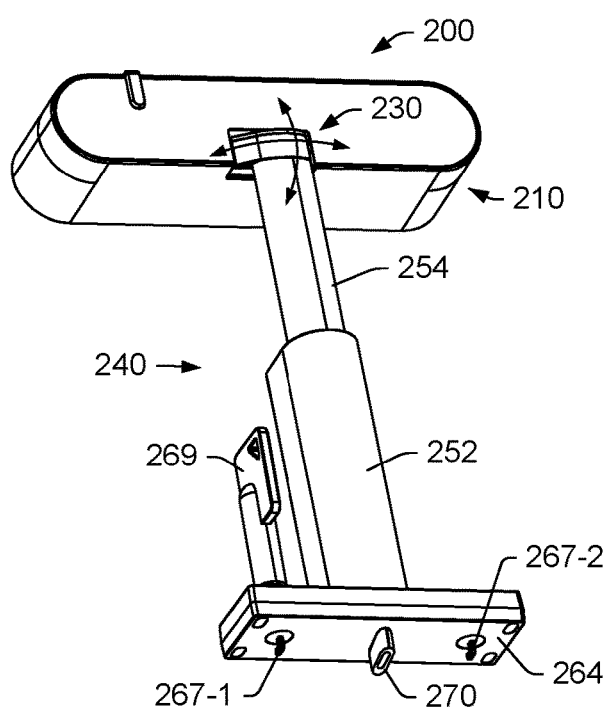
FIG. 7B
FIG. 7A
FIG. 7C

1112

1114

1116

1118

1120

1122

1124

1126

1128

1130

MOUNTABLE DISPLAY CAMERA ASSEMBLY WITH ARM

TECHNICAL FIELD

Subject matter disclosed herein generally relates to cameras for computing and display devices.

BACKGROUND

A system can include a display assembly with a display where, for purposes of person-to-person communications, the system can include a camera such as a web cam.

SUMMARY

A system can include a display assembly that includes a display, a display side, a back side and a frame, where the back side includes a serial bus socket; and a camera assembly that includes a camera head unit coupled to an end of an arm, where an opposing end of the arm includes a serial bus connector receivable by the serial bus socket of the back side of the display assembly. A camera assembly can include a camera head unit; and an arm where the camera head unit is coupled to an end of the arm and where an opposing end of the arm includes a serial bus connector receivable by a serial bus socket. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 7A, FIG. 7B and FIG. 7C are a perspective view of an example of a camera assembly, a perspective view of an example of a portion of a camera assembly and a perspective view of an example of a camera assembly, respectively;

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
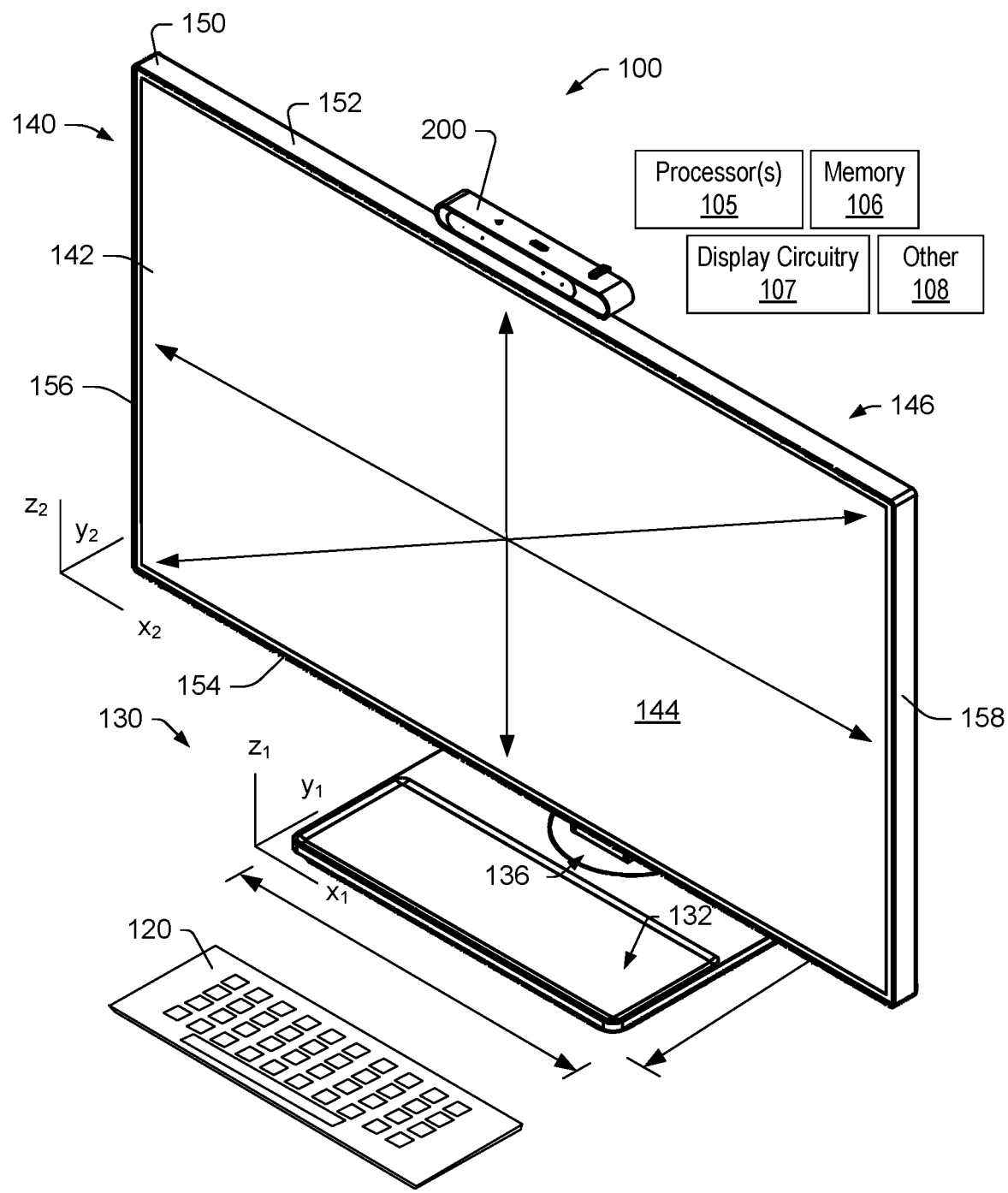
FIG. 1 is a perspective view of an example of a system.

FIG. 1 shows a perspective view of an example of a system 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc. As an example, the system 100 may include one or more accessories, peripherals, etc. For example, consider a keyboard 120 that may be operatively coupled to at least one of the one or more processors 105.

As shown in FIG. 1, the system 100 includes a display assembly 140 with a display 142 that may utilize one or more technologies (e.g., LED, LCD, etc.). The display assembly 140 can include a display side 144, a back side 146 and a frame 150. The display circuitry 107 can be operatively coupled to at least one of the one or more processors 105, for example, to receive data, instructions, etc., for rendering text, graphics, images, etc., to the display side 144 of the display 142.

As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display side 144 is an input surface. For example, the display side 144 may receive input via touch, a stylus, etc. As an example, the display assembly 140 can include a touchscreen display where a finger, a stylus, etc., can be utilized; noting sensing as to input may occur with or without physical contact between a finger and the display side 144, between a stylus and the display side 144, etc., depending on the type of input circuitry utilized (e.g., resistive, capacitive, acoustic wave, infrared, optical, dispersive signal, etc.).

In the example of FIG. 1, the system 100 can include a base 130 that includes an upper surface 132 and an arm 136 that is operatively coupled to the display assembly 140. For example, the arm 136 can extend from the base 130 where the display assembly 140 includes an arm mount that couples the arm 136 to the display assembly 140, for example, on the back side 142 of the display assembly 140 that is opposite the display side 144 of the display assembly 140. As an example, the base 130 and the arm 136 can be a stand for the display assembly 140.

As shown in the example of FIG. 1, the display side 144 may be centered along a centerline of the system 100 and may be disposed at an angle that can be defined by the base 130 or a flat support surface such as a desktop, a tabletop, a countertop, etc., where the base 130 or the flat support surface can be planar and horizontal. As shown, the arm 136 rises from the base 130 at an angle that may be normal to the base 130 or the flat support surface (e.g., a 90 degree angle). As to an angle of the display side 144, it may be 90 degrees, greater than 90 degrees or less than 90 degrees.

The display side 144 can be part of the display 142 that includes or is operatively coupled to the display circuitry 107, which may include one or more types of touch, digitizer, etc., circuitry. As shown, the base 130 and the display assembly 140 and/or the display side 144 can be defined with respect to one or more coordinate systems such as, for example, one or more Cartesian coordinate systems (see, e.g., $z_1$ and $x_2, y_2, z_2$). As shown, the display side 144 can be defined by a display area, which may be two-dimensional for a substantially flat (e.g., planar) display surface or which may be three-dimensional for a curved display surface, noting that such a curve may be of a relatively large radius of curvature (e.g., 50 cm or more) that gives the display a gentle curve (e.g., consider a radius of approximately the length of an extended arm of a user as traced by movement left and right from a shoulder of a user positioned in front of the display surface by an ergonomic distance). As shown, the arm 136 of the base 130 can be utilized to provide a gap or clearance between a lower edge of the display assembly 140 and a support surface on which the base 130 is supported (e.g., a desktop, tabletop, countertop, etc.). Such a gap may provide for rotation of the display 142 (e.g., from a landscape orientation to a portrait orientation).

In the example of FIG. 1, the frame 150 can include edges 152, 154, 156 and 158 where the edges 152 and 154 are long edges and where the edges 156 and 158 are short edges. For example, the frame 150 can be substantially rectangular (e.g., a rectangular form factor) and planar or rectangular and curved. The frame 150 may include a landscape orientation as shown in FIG. 1 where the long edges 152 and 154 are substantially horizontal and a portrait orientation where the long edges 152 and 154 are rotated by approximately 90 degrees to be substantially vertical. The ability to transition from one orientation to the other may provide a user with options that can be ergonomic, content dependent, etc. In the example of FIG. 1, the system 100 can include features that provide for transitioning the frame 150 between portrait and landscape orientations.

As an example, the display assembly 140 may include a bezel or bezels that occupy a portion of the front side (e.g., the display side 144) or the display assembly 140 may be substantially bezel-less or completely bezel-less. A bezel-less display assembly can provide for a display surface dimensions that are approximately the same as frame dimensions. As an example, where a frame edge thickness is visible from a display side, the frame edge thickness may be less than approximately 0.5 cm in thickness and considered part of a substantially bezel-less approach. Where a display extends to an edge, where a frame edge thickness is not visible, such an approach can be considered part of a bezel-less approach. Bezel and bezel-less can be defined with respect to active display area as in some display assemblies, a bezel may be internal, being disposed beneath a cover glass.

Where a display assembly is bezel-less, space does not exist for a bezel integrated front facing camera. And where a display assembly includes a bezel along at least one edge, integration of a front facing camera into a bezel region takes space and may dictate the size of the bezel and hence a ratio of display assembly area to active display area.

In some instances, a camera-less display assembly may be desirable. And, where a camera is not desired, it may be easier to manufacture a display assembly that is a bezel-less.

In the example of FIG. 1, the system 100 can include the display assembly 140 and a camera assembly 200, which may be part of a kit where a user can couple the camera assembly 200 to the display assembly 140 or not. In the example of FIG. 1, the camera assembly 200 is positioned above the frame 150, along the long edge 152. As an example, the camera assembly 200 may be suitable for being positioned along one of the short edges 156 and 158 of the frame.

A position of the camera assembly 200 can be defined, for example, using one or more of the coordinate systems shown in FIG. 1. For example, a height of the camera assembly 200 can be determined using coordinates of the coordinate system $x_2$, $y_2$, and $z_2$ with reference to coordinates of the coordinate system $x_1$, $y_1$, and $z_1$ or, for example, the height of the camera assembly 200 may be defined with respect to the coordinate system $x_1$, $y_1$, and $z_1$ alone (e.g., a height along $z_1$). Appropriate coordinates of either or both of the coordinate systems may be utilized for a landscape orientation or a portrait orientation of the display assembly 140.

As an example, the camera assembly 200 can include one or more cameras that may individually or collectively define a field of view (FOV). For optical elements, cameras, etc., the field of view (FOV) can be defined by a solid angle through which electromagnetic radiation can be received. In photography, the field of view is that part of the world that is visible through a camera at a particular position and orientation in space; objects outside a FOV when an image is captured are not recorded in the image. In photography, FOV may be expressed as an angular size of a view cone, as an angle of view. For a normal lens, the diagonal field of view can be calculated FOV=2 arctan(SensorSize/2f), where f is focal length.

An angle of view can differ from an angle of coverage, which describes the angle range that a lens can image. An image circle produced by a lens or optical element assembly can be configured to be large enough to cover a photosensor, for example, with no or minimal vignetting toward edges. If the angle of coverage of the lens does not fill the photosensor, the image circle will be visible, with strong vignetting toward the edges, and the effective angle of view can be limited to the angle of coverage.

In the example of FIG. 1, the camera assembly 200 is positioned to provide a forward FOV such that a user of the system 100 can be imaged, for example, for purposes of videoconferencing. The camera assembly 200 may include an adjustable mount where, for example, a user positioned in front of the system 100 may be brought into the FOV of the camera assembly 200 via the adjustable mount. As an example, an adjustable mount may provide for rotation of the camera assembly 200, for example, to allow for a backward facing FOV. As an example, the camera assembly 200 may include multiple cameras, which may include one or more front facing cameras and one or more back facing cameras. In the example of FIG. 1, the camera assembly 200 can include features that provide for tilting, for example, tilting down or tilting up, which may provide for adjustments where the display side 144 is tilted down or tilted up. As an example, the camera assembly 200 may be tiltable and rotatable.

Figure 2:
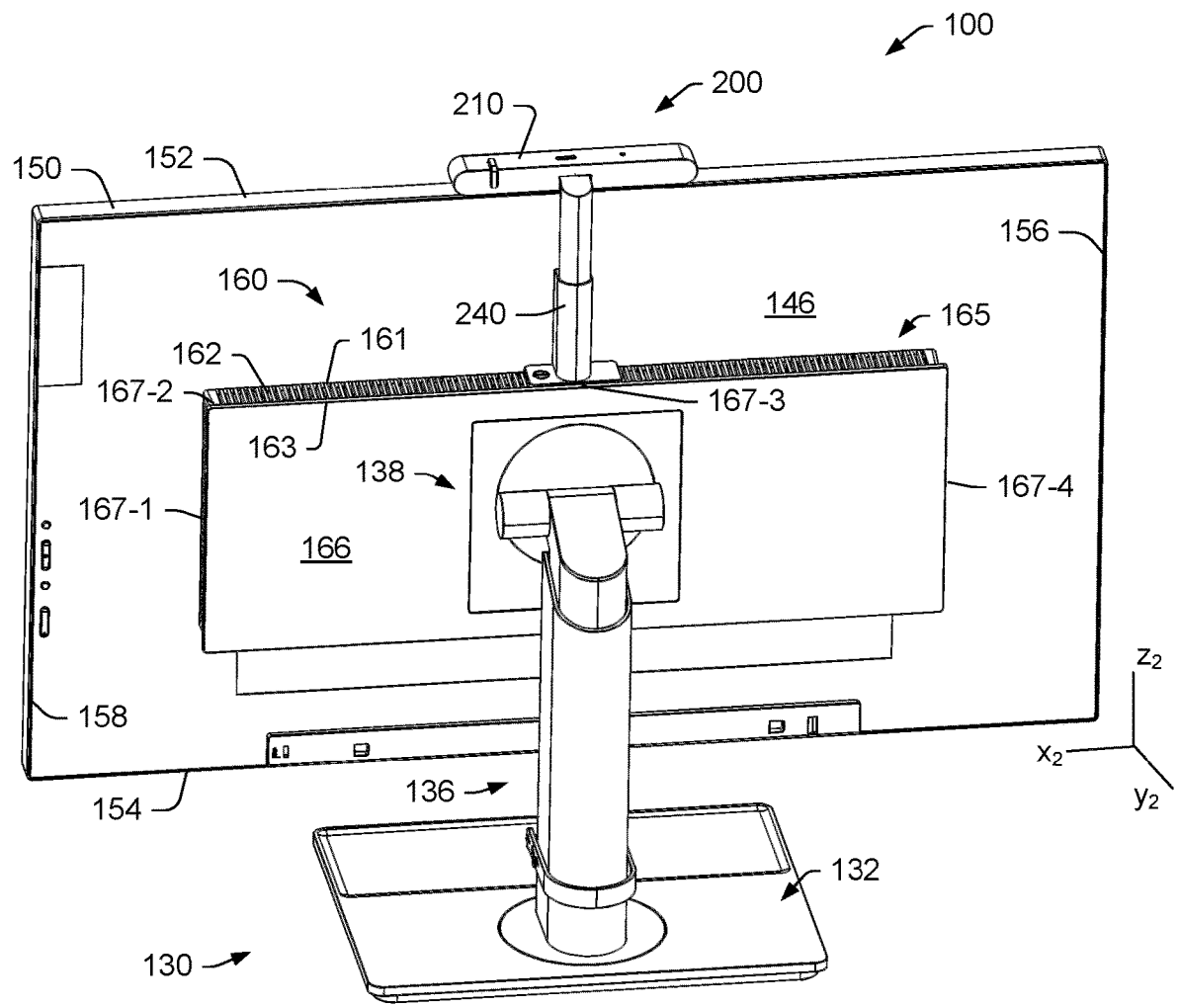
FIG. 2 is another perspective view of the system of FIG. 1.

FIG. 2 shows another perspective view of the system 100 where the camera assembly 200 is shown including a camera head unit 210 coupled to an end of an arm 240, where an opposing end of the arm 240 can include connector receivable by a socket of the back side of the display assembly 140. The camera assembly 200 can include one or more features that provide for positioning of the camera head unit 210. As an example, the arm 240 may be a telescoping arm that can be adjustable as to its length.

In the example of FIG. 2, the base 130 can be operatively coupled to the display assembly 140 via an arm mount 138, which may provide for rotation of the display assembly 140 between landscape and portrait orientations (e.g., for a display with a rectangular form factor). In the example of FIG. 2, the display assembly 140 may include one or more sockets where, for example, if a user desires positioning the camera assembly 200 along one of the short edges 156 and 158 of the frame 150 or along the other long edge 154 of the frame 150, the camera assembly 200 may be de-coupled from one socket and re-coupled via another socket.

As shown in FIG. 2, the display assembly 140 can include a back side housing 160 (e.g., a rear bump, etc.) that includes an edge 161, a wall 162 that extends outwardly from the edge 161 to another edge 163 that can define a perimeter of a back surface 166 of the housing 160. In the example of FIG. 2, various vents 165 are shown as being disposed within the wall 162 (e.g., a vented wall). The wall 162 is also shown as including one or more sockets 167-1, 167-2, 167-3, 167-4, etc.; noting that the housing 160 and/or another portion or portions of the display assembly 140 can include one or more sockets (e.g., connectors, etc.).

As shown in FIG. 2, the housing 160 forms a horizontal ledge and a vertical ledge with respect to the back side 146. A ledge can be part of a step such as a step surface (e.g., a tread, a riser, etc.). As shown, a ledge can be relatively narrow yet wider than one or more dimensions of a connector (e.g., a USB connector, etc.). As an example, a ledge may be of a width that is sufficient to accommodate multiple connectors. As an example, a ledge can include vents where one or more clips can be positioned using one or more of the vents. A vent can include a vent wall or vent walls that can define a vent dimension. As an example, a vent wall may be defined by a length, a width and a thickness. As an example, a vent can include a repetitive pattern where, for example, adjacent vent openings are substantially of the same dimensions.

Figure 3:
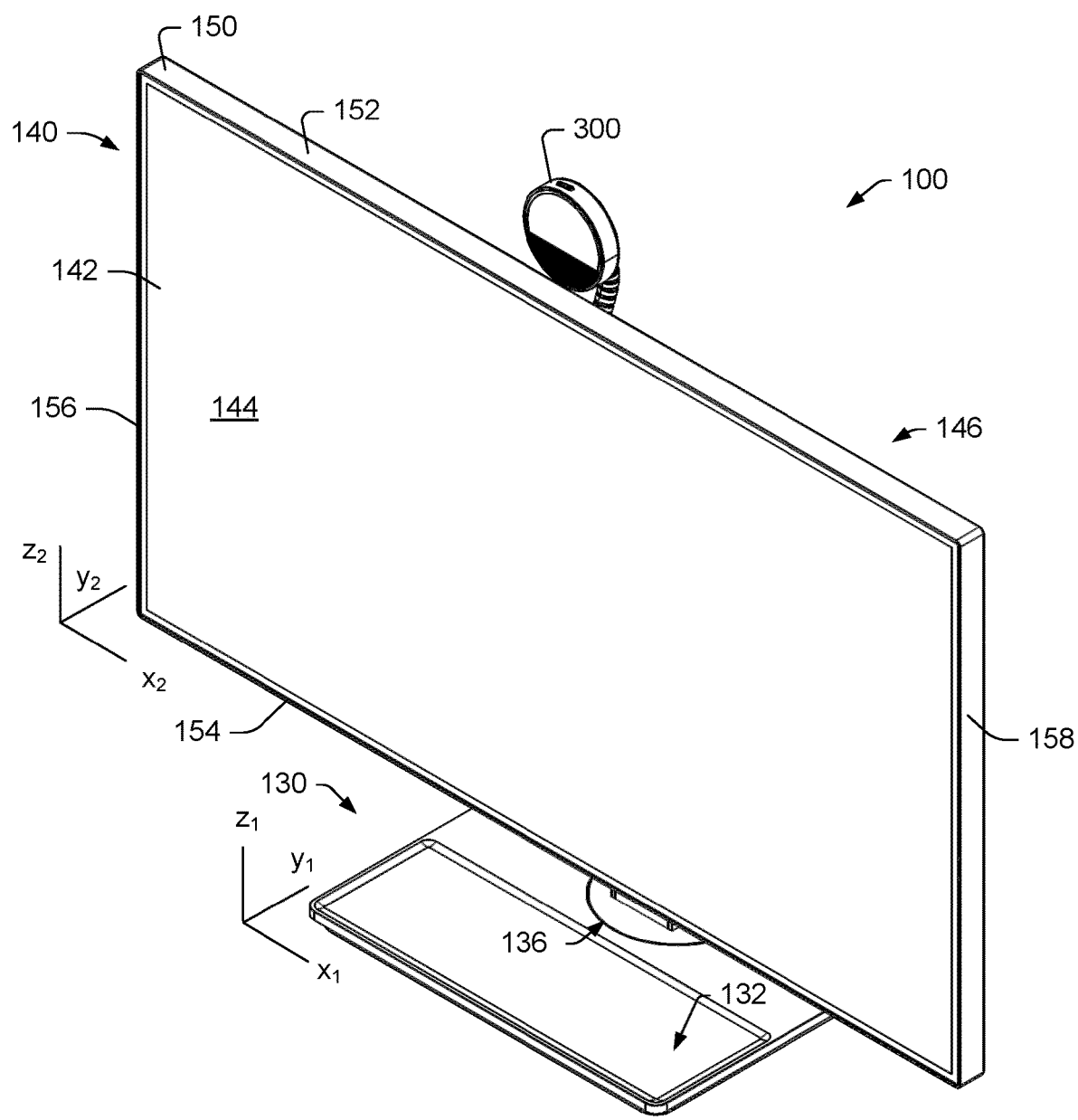
FIG. 3 is a perspective view of an example of a system.

FIG. 3 shows a perspective view of an example of the system 100 that includes the display assembly 140 and a camera assembly 300, which can include one or more features of the camera assembly 200. As an example, the display assembly 140 may provide for coupling to the camera assembly 200 and/or the camera assembly 300, optionally simultaneously where the display assembly 140 includes a suitable number of available sockets.

Figure 4:
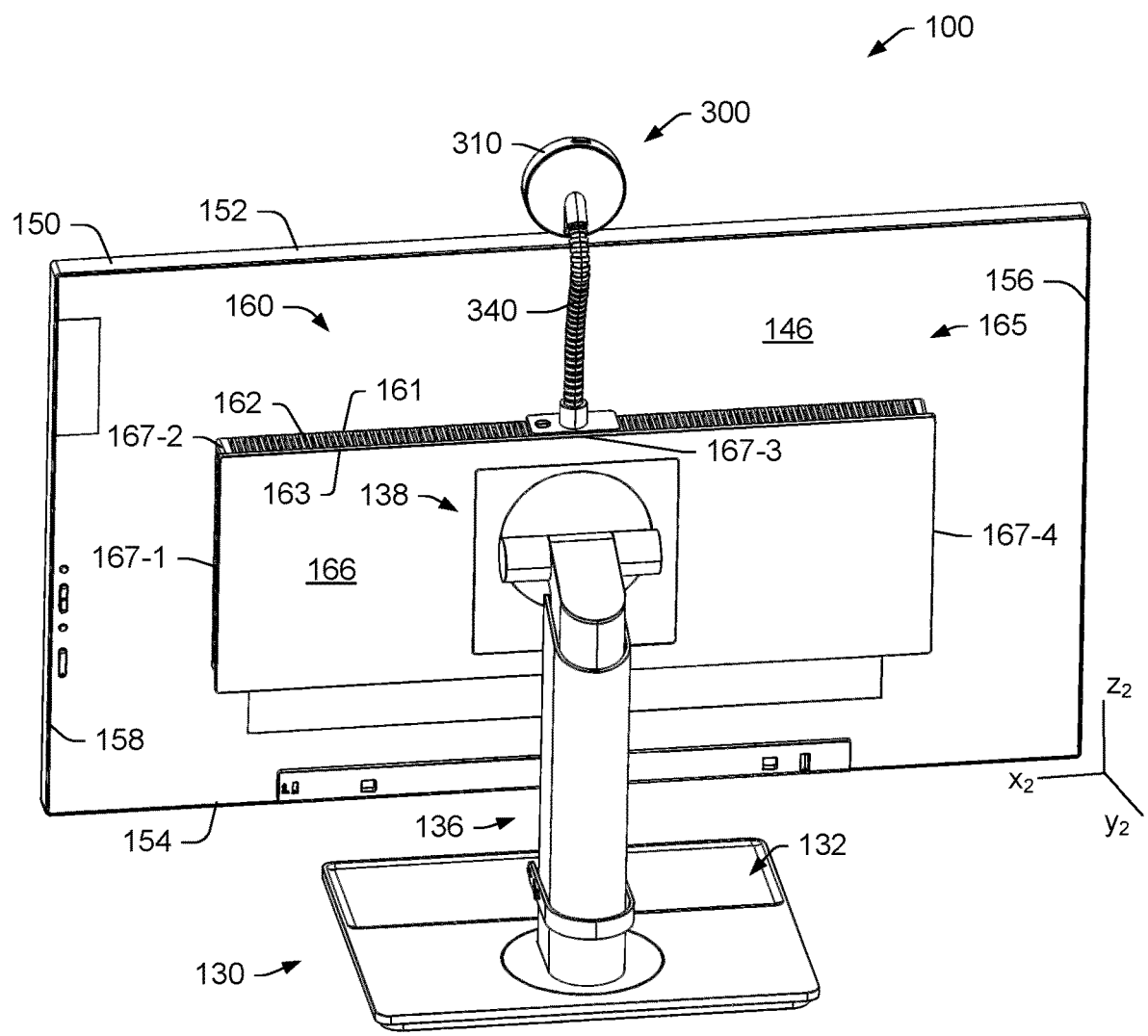
FIG. 4 is another perspective view of the system of FIG. 3.

FIG. 4 shows another perspective view of the example of the system 100 of FIG. 3 where the camera assembly 300 is shown as including a camera head unit 310 coupled to an end of an arm 340, where an opposing end of the arm 340 can include connector receivable by a socket of the back side of the display assembly 140. The camera assembly 300 can include one or more features that provide for positioning of the camera head unit 310. As an example, the arm 340 may be an articulating arm that can be adjustable. For example, consider an arm that includes helical coiling of a self-interlocked ribbed strip of material (e.g., aluminum, steel, polymer, etc.) forming a hollow tube through which one or more conductors can be disposed.

Figure 5:
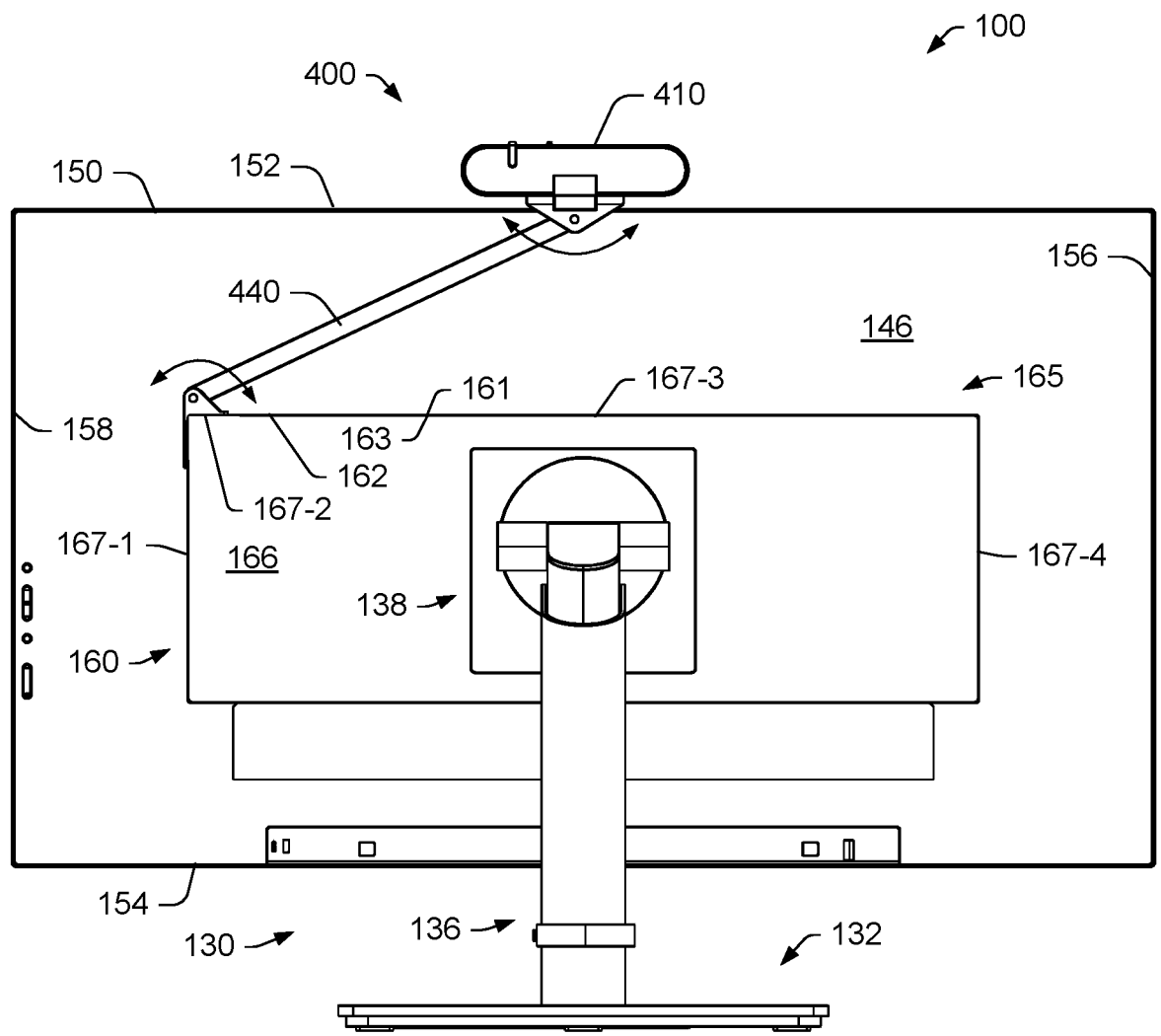
FIG. 5 is a back side view of an example of a system.

FIG. 5 shows a back side view of an example of the system 100 that includes the display assembly 140 and a camera assembly 400, which can include one or more features of the camera assembly 200 and/or one or more features of the camera assembly 300. As an example, the display assembly 140 may provide for coupling to one or more of the camera assembly 200, the camera assembly 300 and/or the camera assembly 400, optionally simultaneously where the display assembly 140 includes a suitable number of available sockets.

In the example of FIG. 5, the camera assembly 400 is shown as including a camera head unit 410 coupled to an end of an arm 440, where an opposing end of the arm 440 can include connector receivable by a socket of the back side of the display assembly 140. As shown, the camera assembly 400 is coupled to the wall 162 at a corner using the socket 167-2. In such an arrangement, the camera assembly 400 can include one or more features that provide for positioning of the camera head unit 410. As an example, the arm 440 may be a telescoping arm that can be adjustable as to its length.

Figure 6:
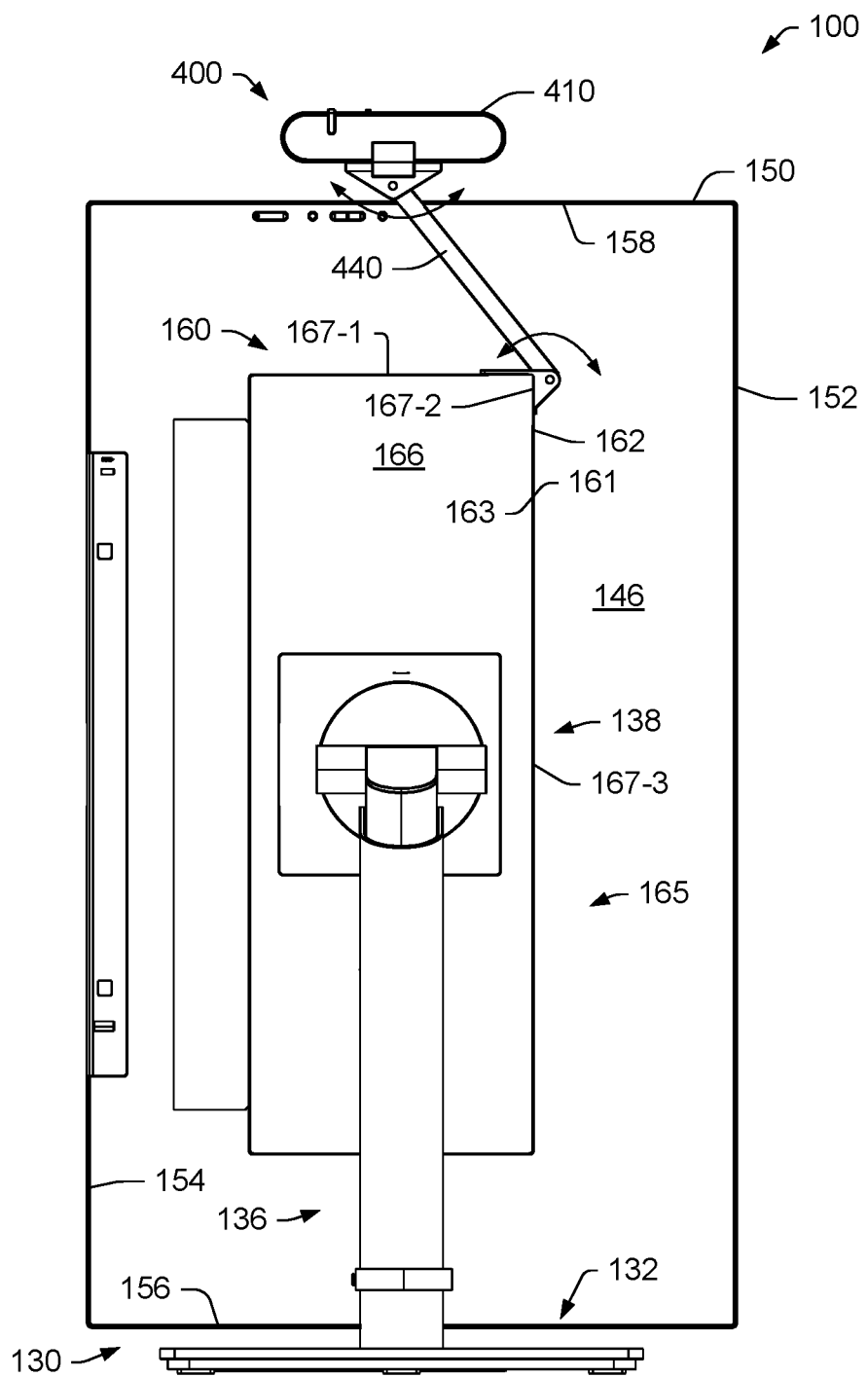
FIG. 6 is a back side view of the system in an alternative orientation.

FIG. 6 shows another back side view of the system 100 where the display assembly 140 is in a portrait orientation rather than in a landscape orientation as shown in FIG. 5. In the example of FIG. 6, the camera assembly 400 provides for positioning of the camera head unit 410 along the edge 158 without having to de-couple and re-couple the camera assembly 400. For example, where a user transitions the display assembly 140 from a landscape orientation to a portrait orientation, or vice versa, the camera assembly 400 can provide for re-positioning of the camera head unit 410 such that it is along a desired edge of the frame 150 of the display assembly 140. For example, where the frame 150 is rotated clockwise with reference to the back side view, the arm 440 may be rotated counter-clockwise with reference to the back side view to thereby move the camera head unit 410 from being along the edge 152 to being along the edge 158. In such an approach, a user can position the camera head unit 410 to be substantially centered along a top edge of the frame 150.

FIG. 7A shows a perspective view of an example of the camera assembly 200 where the arm 240 is shown as being telescopic where a sleeve 252 seats a pole 254 that can be translated upwardly and downwardly to position the camera head unit 210 a desired distance from a base 260. The camera head unit 210 may be of a polygonal shape, a curved shape or a polygonal and curved shape (e.g., consider obround, etc.).

FIG. 7B shows a perspective view of an example of the base 260, which can include a coupling 262 that mates with the sleeve 252 and a plate 264 where a connector 270 can extend outwardly from the plate 264. As shown, the connector 270 may be substantially centered along an axis defined by the sleeve 252 and the coupling 262. As an example, the plate 264 may include one or more features 266 for securing the base 260 to a display assembly (e.g., consider locking with respect to a vent or vents).

FIG. 7C shows a perspective view of an example of the camera assembly 200 where the perspective view shows examples of various bottom side and back side features. As shown, the camera assembly 200 can include a joint 230 that can allow for movement of the camera head unit 210 in one or more directions (e.g. rotate side to side, tilt up and down, etc.). For example, consider a pin joint, a ball joint, a swivel joint, etc., which may provide for movement in one or more degrees of freedom.

As shown in the example of FIG. 7C, a key 269 may be included that cooperates with a keyway as one or more of the one or more features 266 for securing the base 260 to a display assembly. Also shown are two extensions 267-1 and 267-2 that may rotate, for example, responsive to rotation of the key 269. In such an example, the extensions 267-1 and 267-2 may rotate clockwise and/or counter-clockwise and may rotate in the same direction (e.g., synchronously) or may rotate in opposite directions responsive to rotation of the key 269.

As an example, a feature can include an L-shaped extension, a T-shaped extension, etc., that can be oriented for receipt in a vent opening and then rotated such that a cross-member or end extension can be seated behind a vent wall or vent walls that define the vent opening. As an example, the feature 266 can include a slot, flats, keyway, etc., which may indicate an orientation of an extension to facilitate placement with respect to an opening in a display assembly. For example, consider a tool-based approach where an end of a flat-headed screw driver can rotate the feature 266 to lock to a display assembly or to un-lock from a display assembly or, for example, consider a tool-based approach where the key 269 is utilized in a keyway.

In the example of FIG. 7B and the example of FIG. 7C, the connector 270 is shown as being a serial bus connector such as, for example, a universal serial bus connector (e.g., USB connector). Such a serial bus connector can provide for transmission of data and/or power. For example, conductors may extend from the connector 270 to circuitry of the camera head unit 210 to power such circuitry, to instruct such circuitry and/or to receive data from such circuitry.

As an example, the camera head unit 210 can include one or more cameras, one or more microphones, one or more shutters, one or more status lights, etc. The camera assembly 200 can be suitable for use in videoconferencing where it can be a media capture unit for capture of video and audio. As an example, a display assembly can include and/or be operatively coupled to one or more network interfaces where captured media of the camera assembly 200 can be transmitted via one or more networks.

Figure 8:
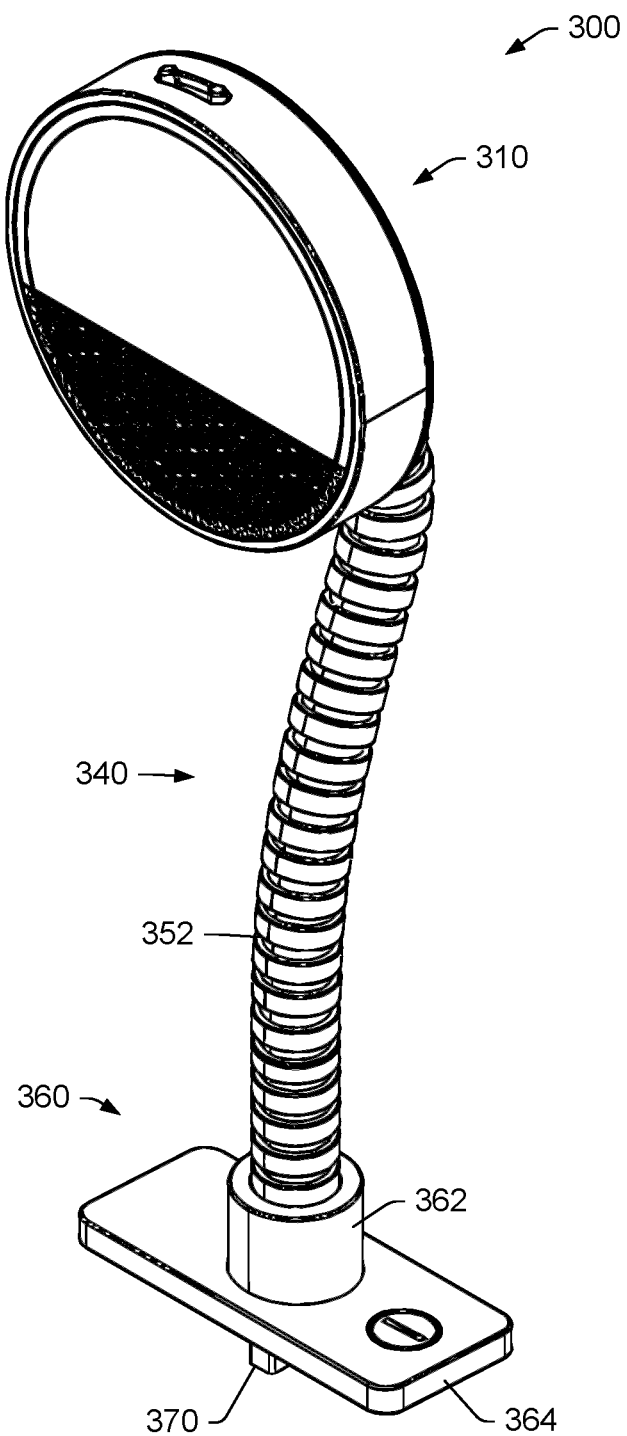
FIG. 8 is a perspective view of an example of a camera assembly.

FIG. 8 shows a perspective view of an example of the camera assembly 300 where the arm 340 is shown as being an articulating arm via an articulating tube 352 that can be received by a coupling 362 that extends from a plate 364 of a base 360 where the base can include a connector 370. In such an example, the camera head unit 310 can be maneuvered via the articulating tube 352. As mentioned, an articulating tube may include a helical structure such as a helical coiling of a self-interlocked ribbed strip of material or materials where one or more conductors can be disposed in a tube defined by the helical coiling. As an example, the camera head unit 310 can be of a polygonal shape, a curved shape (e.g., oval, ellipsoidal, circular, etc.) or a polygonal and curved shape (e.g., consider obround, etc.). In the example of FIG. 8, the camera head unit 310 may be defined by a cylindrical coordinate system, for example, with an axial coordinate at a center and a radial coordinate that can define various features, which may be specified according to an azimuthal angle.

Figure 9:
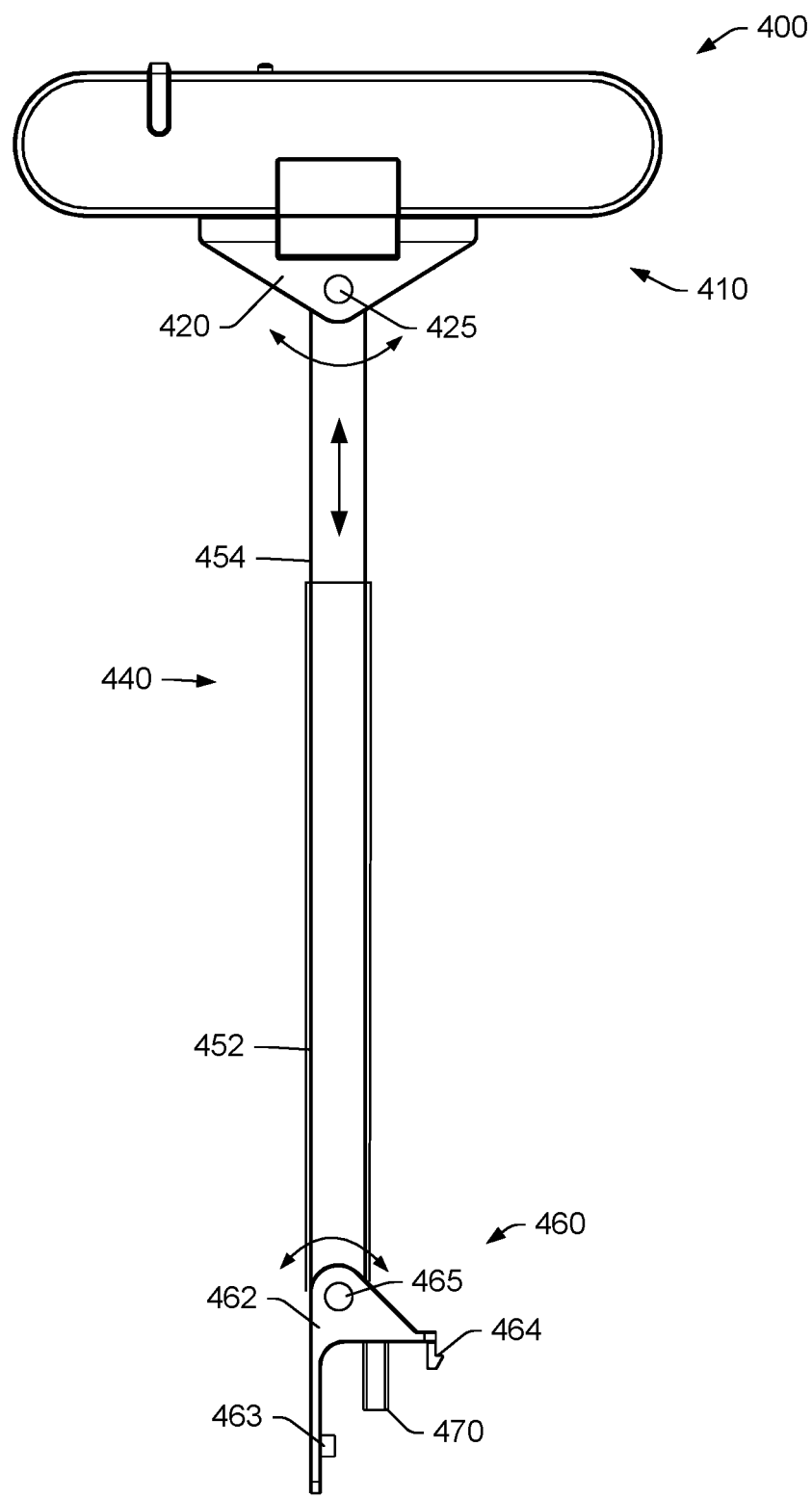
FIG. 9 is a back side view of an example of a camera assembly.

FIG. 9 shows a back side view of an example of the camera assembly 400 where the arm 440 is shown as being a telescoping arm that includes a sleeve 452 and a pole 454 that can be translated with respect to the sleeve 452. At one end of the arm 440, the camera assembly 400 includes a mount 420 that includes a joint 425 that provides for pivoting of the camera head unit 410 (e.g., clockwise, counter-clockwise, etc.) and optionally movement in one or more degrees of freedom (e.g., consider a ball joint, etc.). At an opposing end of the arm 440, the camera assembly 400 includes a base 460 that includes a coupling 462, a joint 465 and a connector 470. As shown, the base 460 can include one or more other features 463 and 464, which may be utilized to help secure the base 460 to a display assembly. For example, the feature 463 may be a screw that can be rotated to apply force to a display assembly to help prevent removal of the base 460 from a display assembly and, for example, the feature 464 may be a prong that can be seated in an opening such as a vent opening of a display assembly. As shown, a camera assembly can include one or more features that can help secure the camera assembly to a display assembly (e.g., anti-theft features, etc.). As an example, the feature 463 may be a rotatable feature or a static feature. As to a rotatable feature, consider, for example, one or more of the features shown in FIGS. 7A, 7B and 7C (see, e.g., 266, 267-1 and 267-2).

Figure 10:
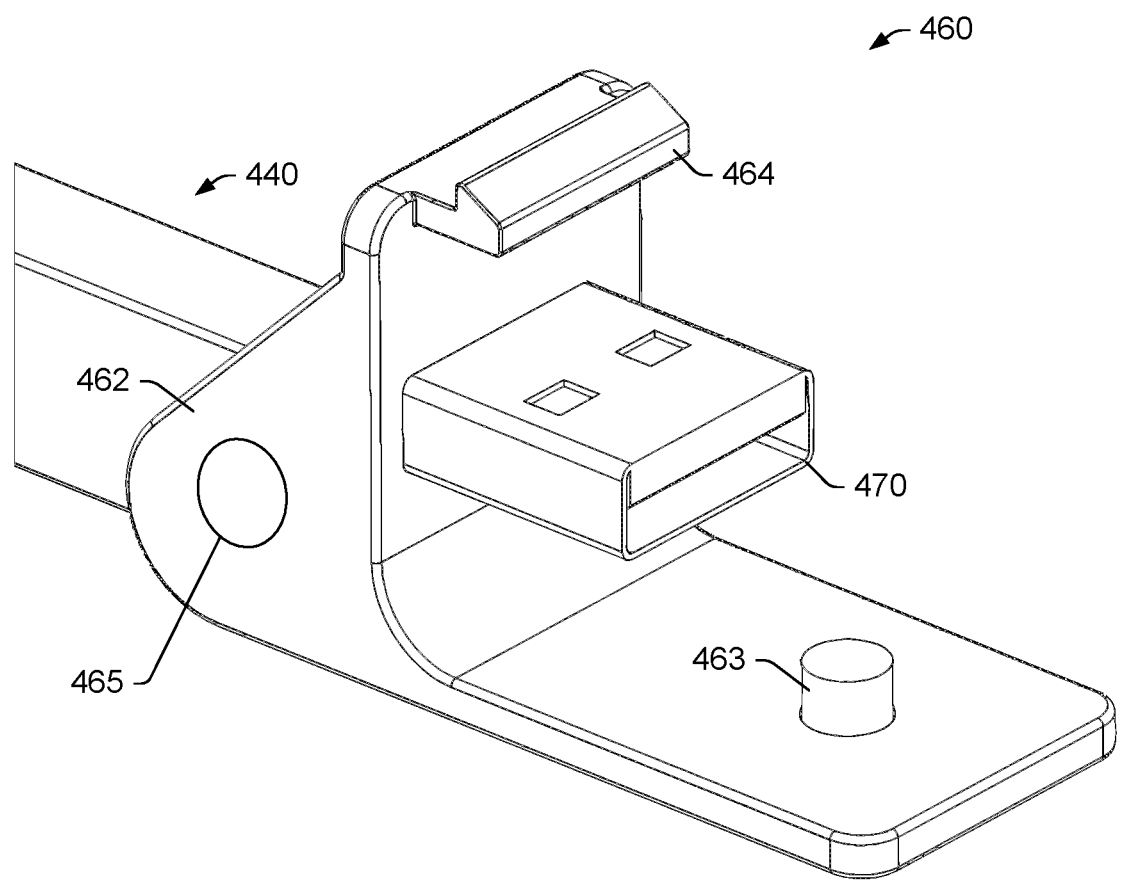
FIG. 10 is a perspective view of an example of a portion of a camera assembly.

FIG. 10 shows a perspective view of a portion of the camera assembly 400. As shown, the base 460 can include various features such as one or more of the features 463 and 464. As an example, a display assembly can include a socket such as a serial bus socket that is disposed proximate to a corner where a screw (e.g., a bolt, etc.) can be utilized to help lock in a serial bus connector received by the serial bus socket. As an example, a display assembly can include a socket such as a serial bus socket that is disposed proximate to a vent opening or vent openings where a prong or prongs can be utilized to help lock in a serial bus connector received by the serial bus socket.

Figure 11:
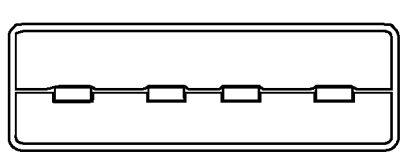
FIG. 11 is a series of diagrams of examples of equipment.
Figure 11:
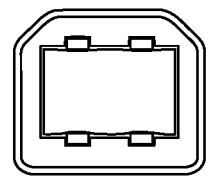
Figure 11:
Figure 11:
Figure 11:
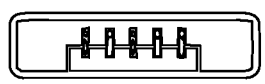
Figure 11:
Figure 11:
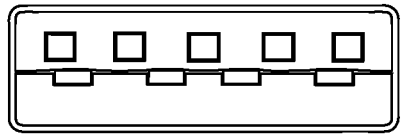
Figure 11:
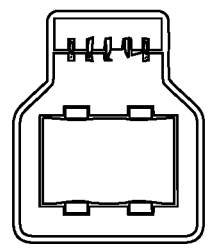
Figure 11:
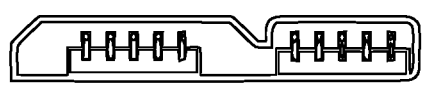
Figure 11:
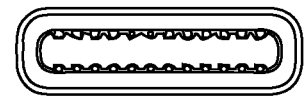

FIG. 11 shows some examples of types of sockets, connectors, etc., 1112, 1114, 1116, 1118, 1120, 1122, 1124, 1126, 1138 and 1130. For example, consider one or more of USB A, B, mini-A, mini-B, micro-A, micro-B, C, etc., sockets, connectors, etc.

As to sizes, consider type C as being of a length of 6.65 mm. As to widths, consider one or more of 12 mm (type-A), 8.45 mm (type-B), 6.8 mm (mini/micro), 8.25 mm (type-C), etc. As to height, consider one or more of 4.5 mm (type-A), 7.26 mm (type-B), 10.44 mm (type-B SuperSpeed), 1.8 mm to 3 mm (mini/micro), 2.4 mm (type-C), etc.

As an example, one or more other types of sockets, connectors, etc., may be utilized. For example, consider Thunderbolt standard, which combines PCI Express and Mini DisplayPort into a serial data interface; noting that the Thunderbolt 3 standard can use a USB-C connector.

As an example, a camera assembly can be cable-less where an arm connects a camera head unit at one end of the arm to a connector at another end of the arm.

As explained, a camera assembly can be attached to a display assembly via a direct plug in to a USB port built into the display assembly where a camera head unit can be positioned along or above an edge of a frame of the display assembly.

As to length of an arm, it may depend on distance between a socket and an edge of a display assembly. For example, where the socket is at an edge, the arm may be relatively short and/or a connector may be an arm (e.g., functions as a connector and as an arm).

As an example, a top facing socket may be disposed on a bump near a top surface of a display assembly or, for example, disposed within a housing of a display assembly rear bump (e.g., within a vent area).

As an example, a camera assembly can include a USB plug in a bottom surface of a camera head unit and/or on a bottom surface of an arm that can be of a length sufficient to extend from a display housing socket to a top edge of a frame of a display assembly. As explained, where an arm extends to a rear bump top surface of a display assembly to plug in to a socket, a base at an end of the arm may utilize one or more vent openings to snap into the display assembly for securing the base to the display assembly. As an example, an arm may be articulated, telescoping, etc., to allow for attaching to different size display assemblies and/or for use in different orientations of a display assembly.

As an example, a system can include a display assembly that includes a display, a display side, a back side and a frame, where the back side includes a serial bus socket; and a camera assembly that includes a camera head unit coupled to an end of an arm, where an opposing end of the arm includes a serial bus connector receivable by the serial bus socket of the back side of the display assembly. In such an example, the back side of the display assembly can include a ledge where, for example, the serial bus socket is disposed on the ledge.

As an example, an arm of a camera assembly can include an arm length that exceeds a distance between a ledge and a frame of a display assembly. In such an example, the arm may be adjustable in length. For example, consider a telescoping arm, an articulated arm, etc.

As an example, a serial bus socket of a display assembly may be disposed at a lengthwise mid-point of a ledge on a back side of the display assembly. For example, consider a bumped out portion of a display assembly that can define a ledge where the ledge may be centered between opposing edges of a frame of the display assembly. As an example, a serial bus socket may be disposed between a lengthwise mid-point of a ledge and a lengthwise end of the ledge. For example, consider a serial bus socket disposed proximate to a corner defined at least in part by an end of a ledge.

As an example, a display assembly can include a stepped-out housing on a back side. In such an example, the stepped-out housing can form a step with respect to a back side surface of the back side of the display assembly. In such an example, the display assembly can include a serial bus socket that is disposed on the step.

As an example, a camera assembly can include an articulated arm and/or a telescoping arm.

As an example, an arm can include one or more joints. For example, consider one or more pivot joints, one or more ball joints, etc. As an example, a camera assembly can include a pivot joint that allows for clockwise and counter-clockwise rotation of a camera head unit directly or via an arm or arms of the camera assembly. As an example, a camera assembly can include a pivoting arm where, for example, the pivoting arm includes at least one pivot joint.

As an example, an arm of a camera assembly can include a first joint at an end and a second joint at an opposing end, where a camera head unit can be at least pivotable via the first joint and the arm can be at least pivotable via the second joint.

As an example, a display assembly can include a turntable mount that defines a rotational axis wherein a display of the display assembly is rotatable by 90 degrees about the rotational axis. In such an example, the display assembly can include one or more serial bus sockets. For example, consider a first serial bus socket and a second serial bus socket, where the first serial bus socket and the second serial bus socket are disposed on a back side of the display assembly at an angle of 90 degrees with respect to each other about the rotational axis. In such an example, a frame (e.g., a display frame) can include a long edge and a short edge, where a camera head unit can be positionable via an arm along the long edge, and where the camera head unit can be positionable via the arm along the short edge. In such an example, the arm can include a pivot joint that defines a pivot axis and the camera head unit can be pivotable in a clockwise direction and in a counter-clockwise direction about the pivot axis.

As an example, a camera head unit of a camera assembly may be removably coupled to an end of an arm via a serial bus connector. In such an example, a system can include an accessory that removably couples to the end of the arm via a serial bus connector. For example, consider a camera assembly that may be provided as a kit where a camera head unit, a microphone head unit, a lighting head unit, etc., may be removably coupled to an arm where the arm is a serial bus extender. As explained, a camera head unit can include at least one camera and can include at least one microphone.

As an example, an arm of a camera assembly can include opposing ends where a camera head unit is disposed at one end and where an opposing end of the arm includes at least one locking feature. In such an example, the at least one locking feature can provide for locking the camera assembly to a display assembly.

As an example, a system can include a display assembly that includes a processor and memory accessible to the processor. In such an example, the display assembly may be display and computing assembly such as, for example, an all-in-one (AIO) system.

As an example, a camera assembly can include a camera head unit; and an arm where the camera head unit is coupled to an end of the arm and where an opposing end of the arm includes a serial bus connector receivable by a serial bus socket. In such an example, the arm can be an articulated arm and/or a telescoping arm. As an example, an arm can be a pivoting arm that includes at least one pivot joint.

As an example, an arm of a camera assembly can include a first joint at an end and a second joint at an opposing end, where a camera head unit is at least pivotable via the first joint and where the arm is at least pivotable via the second joint.

As an example, an arm of a camera assembly can include a pivot joint that defines a pivot axis where a camera head unit of the camera assembly is pivotable in a clockwise direction and in a counter-clockwise direction about the pivot axis.

As an example, a camera assembly can include an arm where a camera head unit is couple to one end of the arm and where an opposing end of the arm includes a serial bus connector (e.g., a USB male connector) and a locking feature. In such an example, the locking feature may be an anti-theft feature. For example, consider a locking feature that is actuated using a tool where, without the tool, a person may have some difficulty with the locking feature (e.g., moving from a locked position to an unlocked position). In such an example, a passer-by may be deterred from stealing the camera assembly. Where a camera assembly includes an anti-theft feature or features, a user may be more motivated to purchase the camera assembly, which may include one or more higher end features (e.g., high resolution camera, high quality microphones, etc.). As an example, a camera assembly that includes one or more anti-theft features may be suitable for use in a shared workspace environment (e.g., a library, a lobby, a hoteling facility, etc.).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 12:
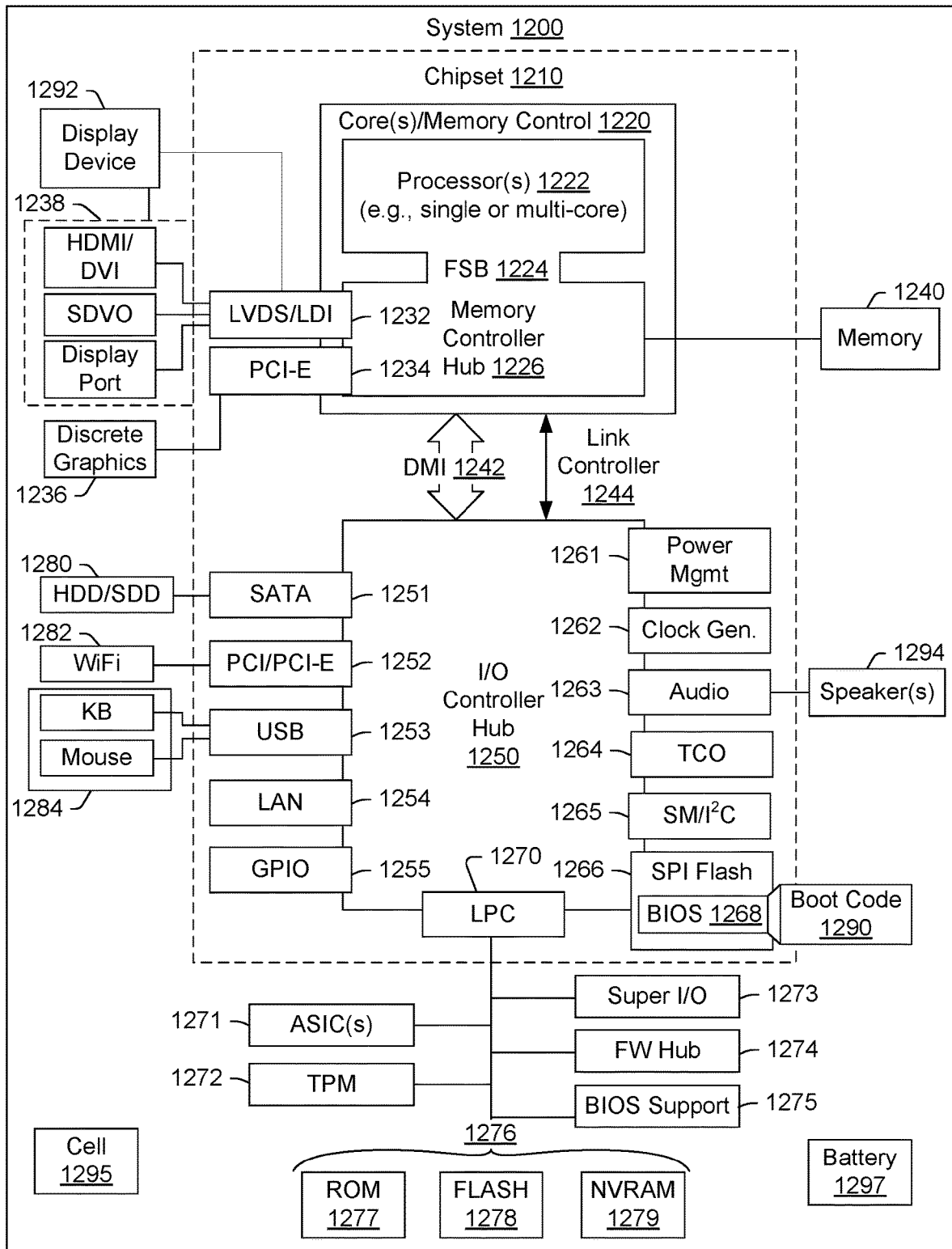
FIG. 12 is a diagram of an example of a system.

While various examples of circuits or circuitry have been discussed, FIG. 12 depicts a block diagram of an illustrative computer system 1200. The system 1200 may be a computer system sold by Lenovo (US) Inc. of Morrisville, N.C. (e.g., a THINKSTATION® system, etc.); however, as apparent from the description herein, a satellite, a base, a display, a computing device, a server or other machine may include one or more features and/or other features of the system 1200.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 12, the system 1200 includes a so-called chipset 1210. A chipset refers to a group of integrated circuits, or chips, that are designed to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. As shown, the system 1200 may include one or more batteries 1297 and, for example, battery management circuitry.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   a display assembly that comprises a display, a display side, a back side and a frame, wherein the back side comprises a serial bus socket and vent openings, and wherein the serial bus socket is disposed proximate to at least one of the vent openings;

and a camera assembly that comprises a camera head unit coupled to an end of an arm, wherein an opposing end of the arm comprises a base and a serial bus connector receivable by the serial bus socket of the back side of the display assembly, and wherein the base covers at least one of the vent openings and less than all of the vent openings.

2. The system of claim 1, wherein the back side comprises a ledge and wherein the serial bus socket is disposed on the ledge.

3. The system of claim 2, wherein the arm comprises an arm length that exceeds a distance between the ledge and the frame.

4. The system of claim 2, wherein the serial bus socket is disposed between a lengthwise mid-point of the ledge and a lengthwise end of the ledge.

5. The system of claim 1, wherein the display assembly comprises a stepped-out housing on the back side.

6. The system of claim 5, wherein the stepped-out housing forms a step with respect to a back side surface of the back side of the display assembly, wherein the step comprises a top surface, wherein the top surface comprises a number of the vent openings, and wherein the serial bus socket is disposed on the top surface.

7. The system of claim 1, wherein the display assembly comprises a turntable mount that defines a rotational axis and wherein the display is rotatable by 90 degrees about the rotational axis.

8. The system of claim 7, wherein the serial bus socket comprises a first serial bus socket and comprising a second serial bus socket, wherein the first serial bus socket and the second serial bus socket are disposed on the back side of the display assembly at an angle of 90 degrees with respect to each other about the rotational axis.

9. The system of claim 7, wherein the arm and the base comprise a pivot joint that defines a pivot axis, wherein arm is pivotable in a clockwise direction and in a counter-clockwise direction about the pivot axis, wherein the frame comprises a long edge and a short edge, wherein the camera head unit is positionable via the arm and the pivot joint along the long edge, and wherein the camera head unit is positionable via the arm and the pivot joint along the short edge.

10. The system of claim 1, wherein the camera head unit is removably coupled to the end of the arm via a serial bus connector and comprising an accessory that removably couples to the end of the arm via a serial bus connector.

11. The system of claim 1, wherein the base comprises a locking feature.

12. The system of claim 1, wherein the display assembly comprises a processor and memory accessible to the processor.

13. The system of claim 1, wherein the base comprises at least one display assembly vent opening extension, receivable by one or more of the vent openings, that secures the base to the display assembly.

14. The system of claim 13, wherein the least one display assembly vent opening extension comprises at least one rotatable display assembly vent opening extension orientable for receipt in a vent opening and rotatable to seat a portion thereof behind one or more vent walls of the display assembly.

15. A camera assembly comprising:

a camera head unit; and an arm wherein the camera head unit is coupled to an end of the arm, wherein an opposing end of the arm comprises a base and a serial bus connector receivable by a serial bus socket, wherein the base comprises at least one display assembly vent opening extension that secures the base to a display assembly, and wherein the base covers at least one vent opening of the display assembly.

16. The camera assembly of claim 15, wherein the arm comprises an articulated arm.

17. The camera assembly of claim 15, wherein the arm comprises a telescoping arm.

18. The camera assembly of claim 15, wherein the arm comprises a pivoting arm that comprises at least one pivot joint.

19. The camera assembly of claim 15, wherein the arm comprises a first joint at the end coupled to the camera head unit and a second joint at the opposing end coupled to the base, wherein the camera head unit is at least pivotable via the first joint and wherein the arm is at least pivotable via the second joint by at least 90 degrees.

20. The camera assembly of claim 15, wherein the arm comprises a pivot joint that defines a pivot axis and wherein the camera head unit is pivotable in a clockwise direction and in a counter-clockwise direction about the pivot axis.

* * * * *